(12) United States Patent
Tentrup et al.

(10) Patent No.: US 12,281,890 B2
(45) Date of Patent: Apr. 22, 2025

(54) METHOD FOR MEASURING THE MUDGUARD EDGE OF A VEHICLE ON A TEST BENCH

(71) Applicant: Dürr Assembly Products GmbH, Püttlingen (DE)

(72) Inventors: Thomas Tentrup, Merzig-Mechern (DE); André Deutsch, Herbitzheim (FR); Joachim Kaufmann, Saarlouis (DE); Simon Stroh, Saarwellingen (DE); Christian Petzinger, Heusweiler (DE)

(73) Assignee: Dürr Assembly Products GmbH, Püttlingen (DE)

( * ) Notice: Subject to any disclaimer, the term of this patent is extended or adjusted under 35 U.S.C. 154(b) by 128 days.

(21) Appl. No.: 18/266,358

(22) PCT Filed: Dec. 9, 2021

(86) PCT No.: PCT/DE2021/100987
§ 371 (c)(1),
(2) Date: Jun. 9, 2023

(87) PCT Pub. No.: WO2022/122085
PCT Pub. Date: Jun. 16, 2022

(65) Prior Publication Data
US 2024/0027187 A1    Jan. 25, 2024

(30) Foreign Application Priority Data
Dec. 11, 2020 (DE) ...................... 10 2020 133 085.5

(51) Int. Cl.
*G01B 11/25* (2006.01)
*G01M 17/007* (2006.01)

(52) U.S. Cl.
CPC ......... *G01B 11/254* (2013.01); *G01M 17/007* (2013.01)

(58) Field of Classification Search
CPC ............ G01B 11/254; G01B 2210/286; G01B 11/2545; G01B 11/03; G01B 11/028;
(Continued)

(56) References Cited

U.S. PATENT DOCUMENTS

2004/0227959 A1* 11/2004 Quist ................. G01N 21/8806
356/625
2007/0183631 A1* 8/2007 Zhang ................ G01B 11/2545
382/110
(Continued)

FOREIGN PATENT DOCUMENTS

DE   10 2007 021 328 A1   11/2018
EP        0 757 229 B1   12/2001

OTHER PUBLICATIONS

International Search Report in PCT/DE2021/100987, mailed Mar. 11, 2022.
(Continued)

*Primary Examiner* — Isiaka O Akanbi
(74) *Attorney, Agent, or Firm* — Collard & Roe, P.C.

(57) ABSTRACT

In a method for measuring the wing edge of a vehicle on a test bed, the test bed has a coordinate system in which the Z-axis is the vertical axis, the X-axis is an axis on the test bed extending in the horizontal plane in the longitudinal direction of a vehicle located on the test bed for testing, and the Y-axis is an axis of the test bed extending perpendicular to the X-axis in the horizontal plane. In determining the position and orientation of the wing edge, a light pattern projected onto a vehicle by an illumination unit is moved and recorded by two imaging units. A subset for evaluation
(Continued)

is formed from the 3D point clouds determined stereophotogrammetrically from the recordings.

4 Claims, 4 Drawing Sheets

(58) Field of Classification Search
CPC .............. G01M 17/007; G06T 7/0004; G06T 2207/10028; G06T 2207/30164; G06T 7/521; G06T 7/593; G06T 7/13; G06T 7/73
USPC ........................................................ 356/603
See application file for complete search history.

(56) References Cited

U.S. PATENT DOCUMENTS

| | | |
|---|---|---|
| 2010/0060885 A1 | 3/2010 | Nobis et al. |
| 2014/0267699 A1 | 9/2014 | Dorrance et al. |
| 2023/0173982 A1* | 6/2023 | Wieczorek ............. H04N 7/183 |

OTHER PUBLICATIONS

English translation of the International Preliminary Report on Patentability and Written Opinion of the International Searching Authority in PCT/DE2021/100987, mailed Jun. 22, 2023.

* cited by examiner

METHOD FOR MEASURING THE MUDGUARD EDGE OF A VEHICLE ON A TEST BENCH

CROSS REFERENCE TO RELATED APPLICATIONS

This application is the National Stage of PCT/DE2021/100987 filed on Dec. 9, 2021, which claims priority under 35 U.S.C. § 119 of German Application No. 10 2020 133 085.5 filed on Dec. 11, 2020, the disclosure of which is incorporated by reference. The international application under PCT article 21(2) was not published in English.

The present invention relates to a method for measuring the wing edge of a vehicle on a test bed according to claim 1.

For better visualisation of the invention, a coordinate system of the test bed is first defined as follows. The test bed has a coordinate system
- in which the Z-axis is the vertical axis,
- in which the X-axis is an axis on the test bed extending in the horizontal plane in the longitudinal direction of a vehicle located on the test bed for testing, and
- in which the Y-axis is an axis that extends perpendicular to the X-axis and perpendicular to the Z-axis.

Measurement of the wing edge takes place, for example, in the application areas of development, production, in the after-sales field or in technical monitoring as regular checking of vehicles in operation for their road safety. By measuring the wing edge, the position and orientation of the wing edge can be determined. The position and the orientation of the wing edge can be determined absolutely in the coordinate system of the test bed or also in relation to other components of the vehicle. These other components can be, for example, wheels, wheel rims and/or brake discs.

The position and orientation of the wing edge is used to determine what is termed the "ride height" of the vehicle. This is the spring deflection of the vehicle body. The ride height is the distance of the wing edge (or of a characteristic point on the wing edge) from the wheel centre. The Z-coordinates of the data of the position and orientation of the wing edge determine the ride height of the vehicle.

Apart from determining the ride height, the ascertained data of the position and orientation of the wing edge can also be used to determine the width of the vehicle.

To this end, the Y-coordinates of the position and orientation of the wing edge of opposing wings on the two sides of the vehicle can be used.

Devices for the photogrammetric measurement of objects are known in the form that these consist of an exposure unit and several imaging units. Light is radiated by the exposure unit. This light is scattered by the object to be measured. The scattered light is recorded by the imaging units. The recordings of the imaging units are evaluated. This evaluation gives rise to a point cloud as a three-dimensional arrangement of the points as a data set. Here the points of the point cloud correspond to points on the surface of the object that scatters the light. The calculation of the point cloud is carried out using two or more imaging units as photogrammetry.

The imaging units are cameras. The calculation and evaluation can take place in an evaluation device, which can be arranged downstream of the imaging units as a separate component. In this case, signals of the imaging units are supplied to the evaluation device as input signals. It is also possible to integrate the evaluation device as a component with the imaging units. In the evaluation device, software is implemented which executes the functions of calculation and evaluation.

In photogrammetry, a two-dimensionally coded texture is placed onto the surface of the three-dimensional object to be measured via the exposure unit. "Texture" in the present context means that a defined light pattern is involved. This texture serves as an aid when evaluating the images recorded by the imaging units. The imaging units view the object from different directions. These imaging units therefore "see" the same light pattern on the surface from different directions. Due to the two-dimensionally coded exposure texture, it is then possible in the evaluation to associate the respectively corresponding points of the imaging units with one another. The position of the points is calculated via the image information of the imaging units in space in relation to the coordinate system of the device for photogrammetric measurement. The position and orientation of the coordinate system of the device for photogrammetric measurement is calibrated in relation to the coordinate system of the vehicle test bed. These points thereby give rise to a three-dimensional point cloud of the object in the coordinate system of the device for photogrammetric measurement. The three-dimensional point cloud of the object in the coordinate system of the vehicle test bed also results from this.

To achieve a high measuring accuracy when detecting the position and orientation of the wing edge, it is necessary to have a high point density in the point cloud. With a high point density, the number of points included in the calculation when evaluating the position and orientation of the wing edge increases. In the case of a suitably high point density, this requires a not inconsiderable computing time. In the production of vehicles in particular, calculation with a high point density requires so much time with regard to evaluation that this has a negative impact on cycle times.

A device for contactless determination of the position and orientation of the wing edge of a vehicle is known from EP 0 757 229 B1. The device comprises first means for determining the position of a defined point of the body of the vehicle in the z-direction, second means for determining the position of the wheel centre point in the z-direction, and an evaluation unit for calculating the ride height of the vehicle from the positions determined using the first and second means, which unit is connected to the first and the second means.

A method is to be proposed with the present invention with which the position and orientation of the wing edge can be determined simply.

This object is achieved according to the present invention according to claim 1 by a method for measuring the wing edge of a vehicle on a test bed. The test bed has a coordinate system in which the Z-axis is the vertical axis, the X-axis is an axis on the test bed extending in the horizontal plane in the longitudinal direction of a vehicle located on the test bed for testing and the Y-axis is an axis extending perpendicular to the X-axis and perpendicular to the Z-axis. The method comprises the following steps:
- projection of a uniform light pattern onto a vehicle using at least one illumination unit, wherein the light pattern can be divided into sub-regions of equal size in such a way that the sub-regions of the light pattern are individualised.
- Recording, by two imaging units, the light pattern projected onto the vehicle, wherein the two imaging units each record the light pattern momentarily projected onto the vehicle.

- movement of the light pattern projected onto the vehicle by stimulating vibration of the illumination unit or at any rate at least of one component of the illumination unit.
- stereophotogrammetric determination of a 3D point cloud from the recordings by the two imaging units of the light pattern projected onto the vehicle during vibration of the illumination unit or of the at any rate at least one component of the illumination unit,
- identification of a subset of points from the 3D point cloud, wherein the subset is formed by the intersection of the points of the point cloud
  with a plurality of volumes,
    wherein each volume is delimited by two planes, which extend both in the direction of the Y-axis and in the direction of the Z-axis,
    wherein these two planes have a spacing $\Delta x$ from each other in the direction of the X-axis,
    wherein a plurality of these volumes is located at adjacent positions $x_n$ on the X-axis,
- determination of the position and orientation of the wing edge as a result data set on the basis of the subset of points of the 3D point cloud.

These features signify that the light pattern as such is constant. Added to the points in the point cloud that result from a statically emitted projection of the light pattern onto an object, according to the present invention, are other points in the point cloud resulting from recordings in which the same (uniform) light pattern is projected onto the object, wherein, however, either the illumination unit as a whole or at any rate at least one component of the illumination unit is stimulated to vibrate. This vibration leads to a movement of the projected light pattern. The points in the point cloud are thus "supplemented" in that the points recorded at the moment in which the light pattern is suitably displaced by the vibration are "integrated" into the point cloud.

The illumination unit can be stimulated to vibrate as a whole. The illumination unit can be constructed, for example, such that an image that is affixed to the illumination unit as a transparency, for example, is illuminated by a light source. In this case it is sufficient to stimulate the transparency to vibrate. This stimulation of only the transparency is advantageous to the extent that the transparency has a smaller mass compared with the illumination unit as a whole and thus also has a lower inertia. Vibration of the at any rate at least one component of the illumination unit therefore takes place in such a way that the light pattern projected onto the object is moved in its position on the object.

By moving the light pattern projected onto the vehicle, the density of the calculated 3D point cloud can thus advantageously be increased. Here an increase in the density of the points of the point cloud signifies a reduction in the mean spacing of the points of the point cloud. The movement is caused here by vibration of the illumination unit or at any rate at least of one component of the illumination unit. For example, the movement of the light pattern can be achieved by vibration of a photo plate illuminated by a lamp. The vibration can be caused, for example, by an electric vibration motor, particularly preferably by a piezoelement.

A uniform light pattern is projected by the at least one illumination unit onto the surface of the vehicle. Here the wing edge to be measured is located in the region of the vehicle onto which the light pattern is projected.

The light pattern can be divided into sub-regions of equal size in such a way that the sub-regions of the light pattern are individualised. This means that the individual sub-regions are each unique within the light pattern. These sub-regions can particularly advantageously be determined unambiguously within the light pattern. The light pattern can also be composed of several light patterns with sub-regions respectively individualised in the light pattern. For example, two identical light patterns with individualised sub-regions can be assembled into an overall light pattern. The uniqueness of the sub-regions in the overall light pattern results in this case from the association with one of the two light patterns.

One example of such a light pattern is an overall arrangement of illuminated and non-illuminated points. The overall arrangement can be divided such that the sub-arrangements of point patterns for the single points of the overall arrangement are individualised for the single points taking into account other points adjacent to each single point. This overall arrangement of illuminated and non-illuminated points can take place as a simultaneous and monochromatic projection of the arrangement of illuminated and non-illuminated points onto the wing edge to be measured.

Another example of a light pattern in the context of the present invention is a texture composed of individual surface elements, the forms of which are identical. These surface elements can be square in this case, for example. The surface elements can directly adjoin one another in that the lateral edge of one square forms a lateral edge of an adjacent surface element at the same time. The uniqueness of the surface elements can be achieved by an absent periodicity of the marking in that the state of the individual surface elements is not periodic in the sense of "illuminated" or "non-illuminated". A texture is thus created, for example, the optical impression of which is comparable with the optical impression of a QR code, at least when this is only viewed fleetingly. If this texture is divided into small sub-regions, for example a square with its 8 adjacent squares, a total of $2^9$ combination options (i.e.: 512 combination options) of illuminated and non-illuminated squares results for these 9 squares. $2^9$ unique sub-regions can thus be created, which can be clearly assigned. If the sub-region is taken further and includes the next squares but one, for example, this number increases by the factor of two with each additional square.

The projected light pattern serves as a marking on the surface of the vehicle. This marking is recorded by the two imaging units. A mutual association of the points on the surface of the vehicle by way of the marking is thus possible in the evaluation. This is because the single subsets are individualised.

The illumination can advantageously be realised with a uniform light pattern. This reduces the complexity of the illumination unit, as no dynamic light patterns or sequences of light patterns have to be produced. In particular, no identification phase is necessary, in which portions of the light pattern change and/or are faded in and out. This is sometimes necessary in the prior art to be able to carry out thereby an association of these portions with one another. It is advantageous in this case that the capture of all points of the point cloud takes place simultaneously. The absence of an identification phase increases the measuring rate. "Simultaneously" means in this context that the consecutive measurements during vibration of the illumination unit or of the at any rate at least one component of the illumination unit in this context should be understood as a unified measurement. The procedure described here of vibrating the illumination unit or the at any rate at least one component of the illumination unit serves in the present method to increase the point density. The vibration is therefore not used to be able to associate points on the surface of the vehicle at all. The vibration serves to produce additional points on the surface, so that as a whole a higher point density results.

It is advantageous in this case to select a contrast-rich light pattern to improve the recognition of the light pattern projected onto the surface of the vehicle by the imaging units. Binary patterns in particular, in which surfaces of maximal intensity (i.e. illuminated surfaces) alternate with surfaces of minimal intensity (i.e. non-illuminated surfaces), offer a high contrast and are thus particularly well suited.

The light emitted by the illumination unit can be monochromatic here. This advantageously means that the radiated light as well as the scattered light has sufficient contrast compared with the scattered light of the environment for the method according to the present invention, even without special measures of dimming and with a limited intensity of the radiated light.

If the illumination unit has an LED as a light source, it proves advantageous that only a short warm-up time is required for initial operation. The device is then usually ready for use within a few minutes and requires no protracted heating of assemblies. This is particularly advantageous following initial operation of the device, as operational delays and prolongations of the cycle times in vehicle production associated with this can be avoided.

Stereophotogrammetric determination of the 3D point cloud takes place from the recordings by the two imaging units of the light pattern projected onto the vehicle during vibration of the illumination unit. Here a 3D point cloud can be determined stereophotogrammetrically from the image pairs of the two imaging units respectively in each movement state as a momentary recording. The individual 3D point clouds obtained can be combined to give a common 3D point cloud with a higher density of points. Alternatively, the image pairs of the two imaging units in a plurality of movement states can be combined by a stereo matching algorithm and from this a point cloud with a higher density of points can be obtained compared with the individual point clouds determined stereophotogrammetrically solely from one image pair.

The subset of points from the 3D point cloud is determined by the intersection of the points of the point cloud with a plurality of volumes. The result is a 3D point cloud with points inside the volumes. The number of points in the subset can be increased by increasing the spacing of the two planes of the volumes in the direction of the X-axis $\Delta x$ and by a larger number of volumes.

The spacing of the two planes $\Delta x$ is preferably greater than the mean spacing of the points of the point cloud, but smaller than double the spacing of the points of the point cloud. Advantageously at least one row of points is thereby located in the Z-direction for each volume in the subset. The points in a volume thereby form a curved, substantially vertical line following the surface of the vehicle. The number of volumes can be up to 120 in this case.

The number of points for the evaluation is particularly advantageously reduced by the subset of the point cloud. The reduced number of points in the subset permits a particularly fast and efficient determination of the position and orientation of the wing edge. At the same time, the increased density of the point cloud in the subset permits increased measuring accuracy. As stated, the density of the point cloud is particularly advantageously increased also by vibration of the illumination unit or of the at any rate at least one component of the illumination unit.

Particularly advantageously the wing edge can be determined especially simply by the points on the curved, substantially vertical line. The wing edge can thus be determined, for example, by a change in the Y-coordinates from one point on one of the lines to the next point. This increases the measuring rate of measuring the position and orientation of the wing edge, because in this respect it is a very efficient procedure that can be executed very quickly to determine the position of the wing edges in the points in the respective volume.

In another implementation of the inventive method according to claim 2, the data used for the evaluation is selected as follows before determining the position and orientation of the wing edge.

➢ A first reduction subset of points of the point clouds is produced from the subset.
➢ Only points of the point clouds from only a portion of the volumes (in the sense of claim 1) are taken into account.
➢ In a first evaluation step, the position and orientation data of the wing edge is determined as a first data set based on the points of the first reduction subset.
➢ From the wing edge position and orientation data in the first data set, the position and orientation data of the wing edge in a second data set is determined,
  in that supplementary to the position and orientation data of the wing edge in the first data set, position and orientation data of the wing edge is determined, by extrapolation of the position and orientation data of the wing edge of the first data set, also for the volumes that were not taken into account in the production of the first reduction subset and
  in that the second data set is formed from the union of the position and orientation data of the wing edge of the first data set with the supplementary position and orientation data of the wing edge.
➢ A second reduction subset is produced from the subset in that the intersection is formed from
  the points of the point cloud of the subset
  with a defined environment around the points of the second data set.
➢ The determination of the position and orientation of the wing edge in the result data set takes place based on the data of the second reduction subset.

Terminologically, identical terms to claim 4 are used in connection with claim 2. The two claims each relate to claim 1, wherein claim 4 does not relate to claim 2. In this respect, although the first reduction subset, the first data set and the second reduction subset and the second data set in claim 2 are identical terminologically to claim 4, they have a different meaning in connection with claim 2, which results in the respective context from the features of claim 2 or from the features of claim 4.

The evaluation of the first data set (in claim 2) is advantageously accelerated based on the smaller number of points in the first reduction subset (in claim 2) compared with the subset.

The data of the first data set (in claim 2) can be supplemented particularly advantageously also for the volumes not taken into account when determining the position and orientation of the wing edge by extrapolating the data of the first data set (in claim 2). Such extrapolation of the data is faster here than determination of the position and orientation of the wing edge based on the volumes not taken into account. In this respect a second data set is formed from the union of the points of the first data set with the points additionally obtained by this extrapolation.

To determine the position and orientation of the wing edge more accurately, a second reduction subset (in claim 2) is produced from the subset here. In this case the intersection is formed from
➢ the points of the subset
➢ with a defined environment around the points of the second data set (in claim 2).

This environment can be configured, for example, as a cuboid. It is also possible to define this environment as a torus, which has the line of the wing edge determined in the second data set as centre line. The environment advantageously comprises all points with a defined spacing from the points of the second data set. This spacing is particularly advantageously dependent on the mean spacing of the points of the first reduction subset. The defined environment can also be determined so that it involves here all points of which the Z-coordinates deviate in amount by no more than a predetermined limit value from the Z-coordinates of the points of the first data set. The Y-coordinates are thus not considered in the "point selection". The curve of these Y-coordinates is considered in the subsequent evaluation in order to deduce the position and orientation of the wing edge from a sudden change in the Y-coordinates of points which are adjacent in the Z-direction.

The points of the second reduction subset are used to determine the position and orientation of the wing edge. The second reduction subset particularly advantageously has the same density of points of the point cloud (point spacing) as the subset. The measuring accuracy is retained thereby during evaluation of the position and orientation of the wing edge. By the reduction to the points around the points of the second data set (in the sense of claim 2), the set of points to be evaluated is reduced in comparison with the subset. The determination of the position and orientation of the wing edge can thereby take place particularly fast. Nevertheless, the high measuring accuracy is retained in the last step of the evaluation in that the data in the region of interest is selected specifically for this evaluation. Higher measuring rates are advantageously facilitated thereby.

It is expedient here as a development of claim 2 according to claim 3, when generating the first reduction subset, to incorporate only a portion of the points of the subset in the volumes taken into account when producing the subset to the first reduction subset. In this case the point spacing between the points incorporated into the first reduction subset is greater than the point spacing in the subset.

The number of points in the first reduction subset is advantageously reduced further thereby, due to which an even faster evaluation of the data of the first data set (in the sense of claim 2) is possible.

It is pertinent to the invention that according to claim 4, the data used for evaluation is selected before determining the position and orientation of the wing edge,
➢ in that a first reduction subset of points of the point clouds is produced from the subset,
   in that only a portion of the points of the subset is incorporated into the first reduction subset,
     wherein the point spacing between the points incorporated into the first reduction subset is greater than the point spacing in the subset,
➢ wherein in a first evaluation step the position and orientation data of the wing edge is determined as a first data set based on the points of the first reduction subset,
➢ wherein a second reduction subset is produced from the subset,
   in that the intersection is formed
     from the points of the point cloud of the subset with a defined environment around the points of the first data set,
➢ wherein the determination of the position and orientation of the wing edge takes place in the result data set based on the data of the second reduction subset.

Terminologically, identical terms to claim 2 are used in connection with claim 4. The two claims each relate to claim 1, wherein claim 4 does not relate to claim 2. In this respect, although the first reduction subset, the first data set and the second reduction subset and the second data set in claim 4 are identical terminologically to claim 2, they have a different meaning in connection with claim 4, which arises below in the consideration of claim 4 in context from the features of claim 4.

Compared with the method according to claim 1, this procedure according to claim 4 proves advantageous. In the procedure according to claim 1, a high point density exists in the subset in the individual volumes over the entire range of coordinates in the direction of the Z-axis. This means that a larger number of data that are comparatively remote from the wing edge in the direction of the Z-axis is still contained in the subset. In this respect some computing operations are still performed that do not lead to any meaningful result with regard to locating the wing edge.

Using the first reduction subset in the sense of claim 4, the position and orientation of the wing edge can be determined initially with a lower point density (higher point spacing between the points) with a less precise evaluation. Here the point spacing between the points incorporated into the first reduction subset is greater than the point spacing in the subset. This can be achieved, for example, by removing individual points from the subset. For example, every second point can be removed from the subset. It is also possible to increase the point spacing still further. Due to the greater point spacing and the lower density of the points associated with this in the first reduction subset, a first determination of the position and orientation of the wing edge in a first data set can take place particularly quickly.

The approximate position and orientation of the wing edge are yielded initially by the first data set. Points of a first data set can be calculated thereby that correspond to the position and orientation of the wing edge. This calculation takes place on the basis of the first reduction subset in the coordinate system of the test bed. For a more precise determination of the position and orientation of the wing edge, a second reduction subset is produced here from the subset. This second reduction subset is formed by the intersection, which results from:
➢ the points of the subset
➢ with a defined environment around the points of the first data set.

This environment can be configured, for example, as a cuboid. It is also possible to define this environment as a torus, which has the line of the wing edge determined in the first data set as centre line. The environment advantageously comprises all points with a defined spacing from the points of the first data set. This spacing is particularly advantageously dependent on the mean spacing of the points of the first reduction subset. The defined environment can also be determined so that it involves all points of which the Z-coordinates deviate in amount by not more than a predetermined limit value from the Z-coordinates of the points of the first data set. The Y-coordinates are thus not considered in the "point selection". The curve of these Y-coordinates is considered in the subsequent evaluation in order to deduce the position and orientation of the wing edge from a sudden change in the Y-coordinates of points which are adjacent in the Z-direction.

The points of the second reduction subset are used to determine the position and orientation of the wing edge. The second reduction subset advantageously has the same density of points (point spacing) as the subset. The measuring accuracy of the high resolution of the points in the point cloud is thereby retained when determining the position and orientation of the wing edge. By reducing the points in the second reduction subset to only the points that lie in a environment around the position and orientation of the wing edge determined previously (with a reduced measurement resolution), the set of points to be evaluated is reduced compared with the subset. This reduction takes place, however, specific to the region of interest for more accurate evaluation. Determination of the position and orientation of the wing edge thereby takes place as a whole particularly fast, but nevertheless with a high level of accuracy.

Higher measuring rates are advantageously enabled thereby. This proves particularly advantageous when using the method in the production of vehicles. This is crucially reliant on short cycle times with a high resolution and accuracy at the same time.

Exemplary embodiments of the invention are described in greater detail on the basis of drawings.

These Show.

FIGS. 1, 2, 3 and 4 show two imaging units 2a and 2b and an illumination unit 3 of a device for the photogrammetric measurement of objects 1. A light pattern 4 is projected onto a wing 12 of a vehicle 8 via the illumination unit 3. This light pattern 4 is recorded by the two imaging units 2a and 2b. The light pattern 4 projected onto the vehicle 8 is moved by stimulating vibration of the illumination unit 3 or at any rate at least of one component of the illumination unit 3. In an evaluation unit, the stereophotogrammetric determination takes place of a 3D point cloud from the recordings by the two imaging units 2a and 2b of the light pattern 4 projected onto the vehicle during vibration of the illumination unit 3. This point cloud corresponds to the position of points on the surface of the object to be measured.

The vehicle 8 has a wheel 6 mounted on the vehicle 8. The wing 12 is part of the bodywork of the vehicle 8. The wing 12 ends in the direction of the wheel 6 at its lower end in the wing edge 7.

The vehicle 8 is located on a test bed, wherein the test bed has a coordinate system in which the Z-axis is the vertical axis, the X-axis is an axis on the test bed extending in the horizontal plane in the longitudinal direction of the vehicle 8 located on the test bed for testing and the Y-axis is an axis on the test bed extending perpendicular to the X-axis in the horizontal plane. In the depiction in FIG. 2, the Z-axis and the X-axis are shown. The Y-axis extends into the drawing plane.

Figure 1:
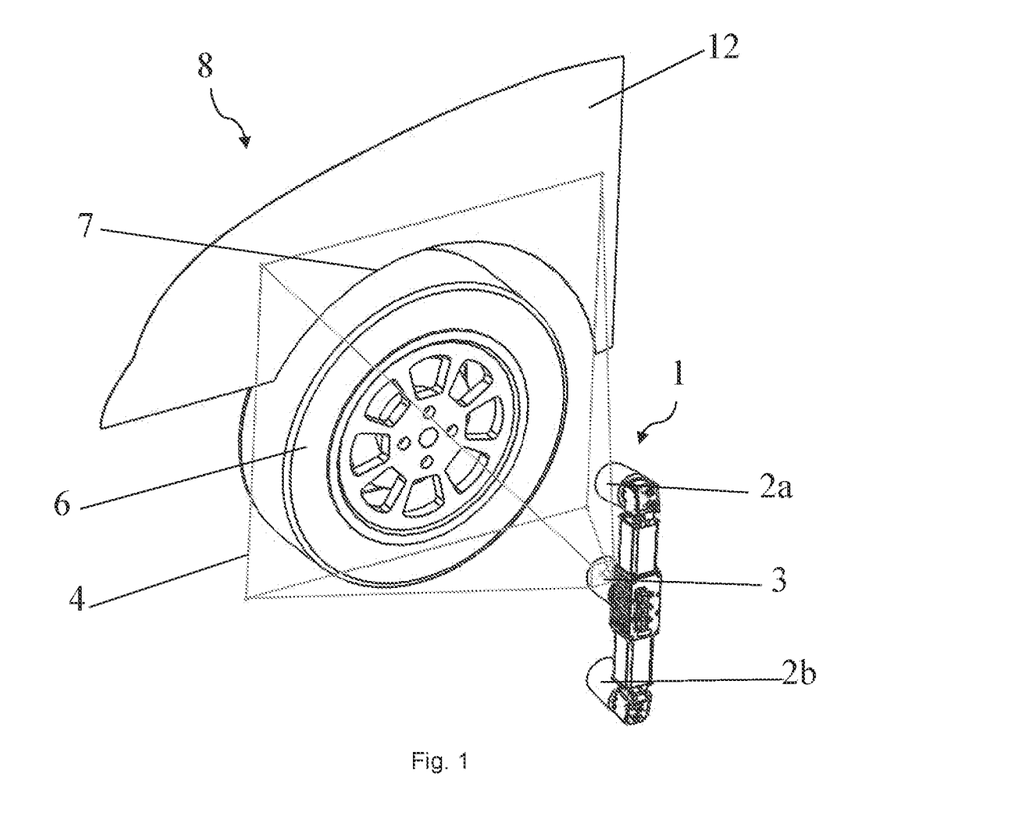
FIG. 1 a view in perspective of a wing of a vehicle, and a device for the photogrammetric measurement of objects, FIG. 2 a side view of a wing of a vehicle, and a device for the photogrammetric measurement of objects, FIG. 3 another side view of a wing of a vehicle, and a device for the photogrammetric measurement of objects, FIG. 4 another side view of a wing of a vehicle, and a device for the photogrammetric measurement of objects.
Figure 2:
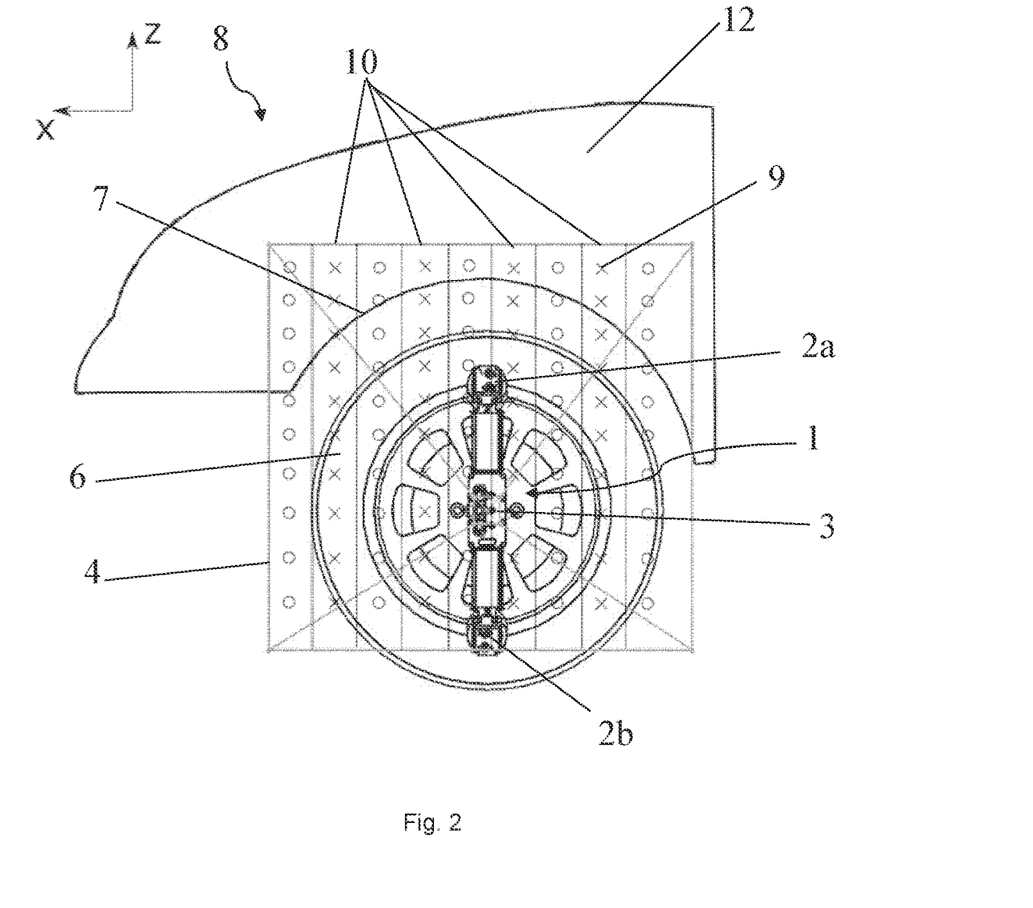

As also depicted in FIG. 2, a subset of points is identified from the points of the 3D point cloud 9 in a first step. Here the subset is formed by the intersection of the points of the point cloud 9 with a plurality of volumes 10. Each volume 10 is delimited by two planes, which extend both in the direction of the Y-axis and in the direction of the Z-axis. These two planes have a spacing $\Delta x$ from one another in the direction of the X-axis. These volumes 10 are located at adjacent positions $x_n$ on the X-axis. Here the points of the point cloud 9 inside the volumes 10 are depicted by crosses and the points of the point cloud 9 outside the volumes 10 are depicted by circles.

The spacing of the two planes $\Delta x$ is greater than the mean spacing of the points of the point cloud 9, but preferably smaller than double the spacing of the points of the point cloud 9. At least one point per volume 10 and Z-coordinate is thereby advantageously located in the subset. The points in one volume 10 thereby form a curved and substantially vertical line following the surface of the vehicle. The points of the curved line are located here substantially in a plane extending in the Y- and Z-direction. The determination of the position and orientation of the wing edge 7 takes place as a result data set based on the subset of points of the 3D point cloud 9.

FIG. 2 visualises the formation of the subset according to claim 1 in this respect.

Figure 3:
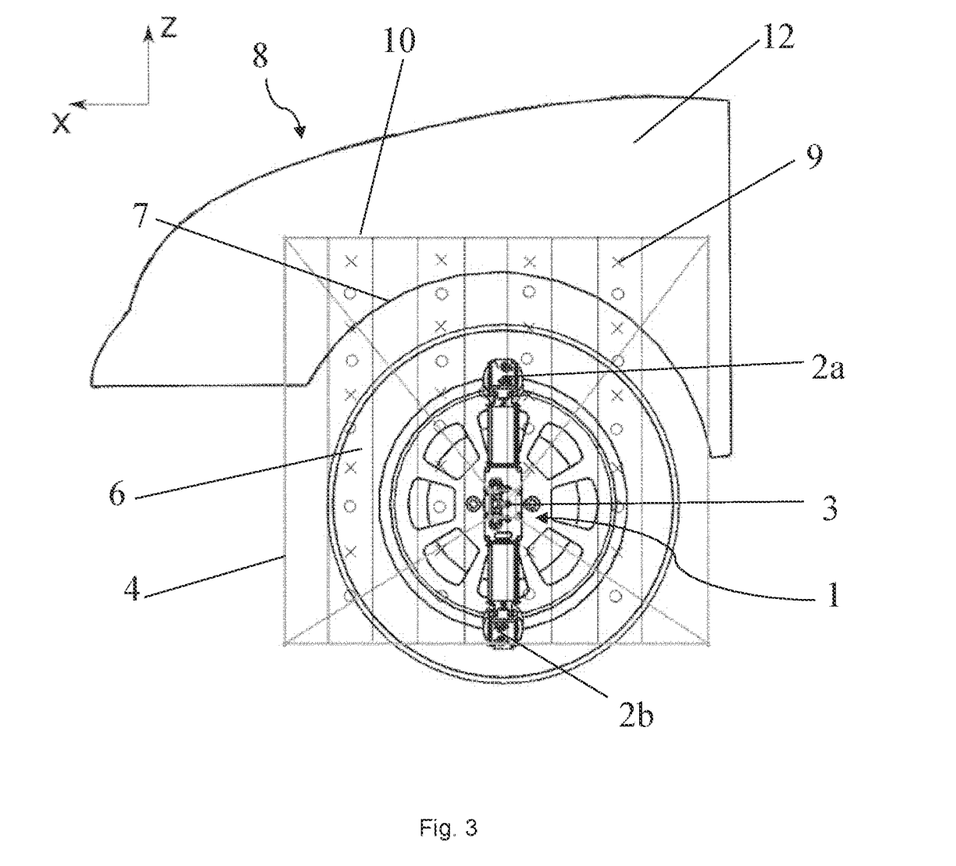

As depicted in FIG. 3, a first reduction subset is produced in a second step from the points of the point clouds of the subset. In this case only a portion of the points of the subset is incorporated into the first reduction subset. The point spacing between the points incorporated into the first reduction subset is greater than the point spacing in the subset.

The points within the subset that are received into the first reduction subset are depicted by crosses. The points within the subset that are not received into the first reduction subset are depicted by circles. In the depiction in FIG. 3, every second point is removed from the subset in the incorporation into the first reduction subset. Due to the greater point spacing and the lower density of points associated with this in the first reduction subset, a first, rough determination of the position and orientation of the wing edge 7 in a first data set can take place particularly fast.

In this respect the depiction in FIG. 3 is a visualisation in the determination of the first reduction subset in the sense of claim 2. A first data set (in the sense of claim 2) was therefore determined, which corresponds to the data of the position and orientation of the wing edge 7 based on the data of the first reduction subset.

Figure 4:
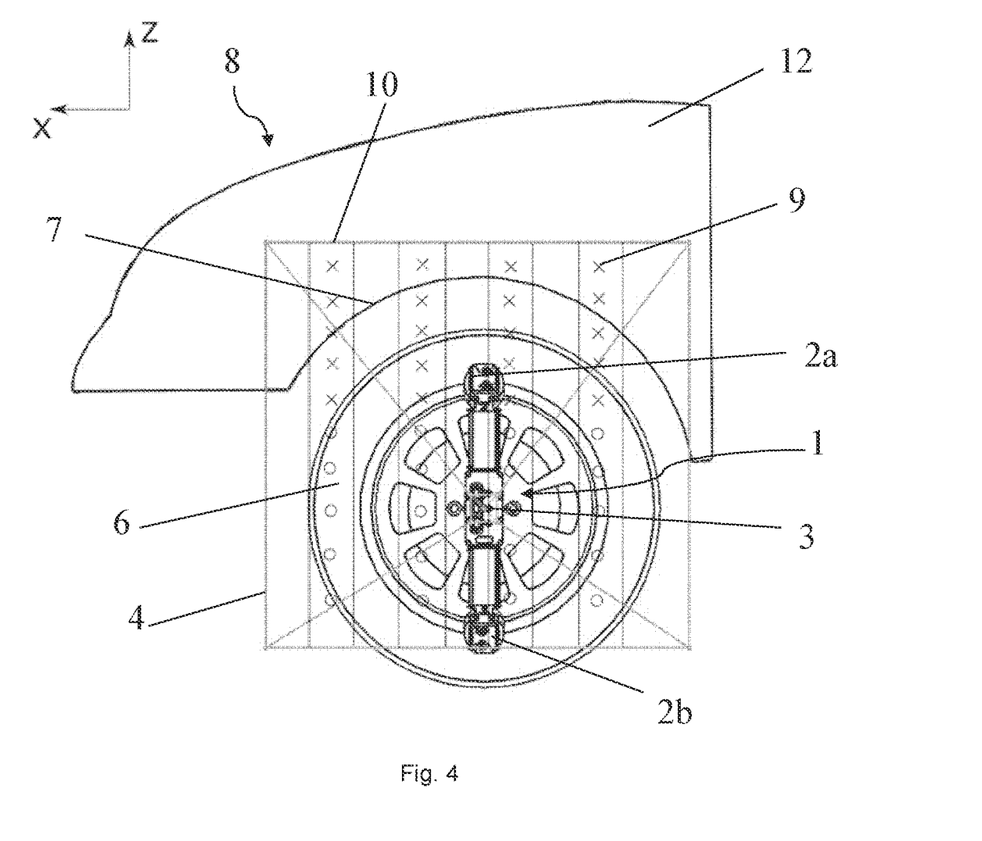

As depicted in FIG. 4, a second reduction subset is produced in a following step to the depiction of FIG. 3. This takes place in that the intersection of the points of the point cloud 9 of the subset is formed with a defined environment around the points of the first data set. The points within the subset that are received into the second reduction subset are depicted by crosses. The points within the subset that are not received into the second reduction subset are depicted by circles. The determination of the position and orientation of the wing edge 7 takes place in the result data set based on the data of the second reduction subset.

The invention claimed is:

1. A method for measuring the wing edge (7) of a vehicle (8) on a test bed,
   ➤ wherein the test bed has a coordinate system,
     wherein in the coordinate system, the Z-axis is the vertical axis on the test bed and
     the X-axis is an axis on the test bed extending in the horizontal plane in the longitudinal direction of a vehicle (8) located on the test bed for testing, and
     the Y-axis is an axis extending perpendicular to the X-axis and perpendicular to the Z-axis,
   ➤ wherein the method comprises the following steps:
     ➤ projecting a uniform light pattern (4) onto a vehicle (8) using at least one illumination unit (3), wherein the light pattern (4) can be divided into sub-regions of equal size such that the sub-regions of the light pattern (4) are individualised,
- recording the light pattern (4) projected onto the vehicle (8) by two imaging units (2a, 2b), wherein the two imaging units (2a, 2b) each record the light pattern (4) projected momentarily onto the vehicle (8),
- moving the light pattern (4) projected onto the vehicle (8) by stimulating vibration of the illumination unit (3) or at any rate at least of one component of the illumination unit (3),
- stereophotogrammetrically determining a 3D point cloud from the recordings by the two imaging units (2a, 2b) of the light pattern (4) projected onto the vehicle (8) during vibration of the illumination unit (3) or of the at any rate at least one component of the illumination unit (3),
- identifying a subset of points from the 3D point cloud (9), wherein the subset is formed by the intersection
  of points of the point cloud (9)
  with a plurality of volumes (10),
    wherein each volume (10) is delimited by two planes, which extend both in the direction of the Y-axis and in the direction of the Z-axis,
    wherein these two planes have a spacing $\Delta x$ from one another in the direction of the X-axis,
    wherein a plurality of these volumes (10) is located at adjacent positions $x_n$ on the X-axis,
  - determining the position and orientation of the wing edge (7) as a result data set based on the subset of the points of the 3D point cloud.

2. The method according to claim 1, wherein
before determining the position and orientation of the wing edge (7), the data used for the evaluation is selected
  - wherein a first reduction subset of points of the point clouds (9) is produced from the subset,
    wherein only points of the point clouds from only a portion of the volumes (10) are taken into account,
  - wherein in a first evaluation step, the position and orientation data of the wing edge (7) is determined as a first data set based on the points of the first reduction subset,
  - wherein from the position and orientation data of the wing edge (7) in the first data set, the position and orientation data of the wing edge (7) is determined in a second data set,
    wherein supplementary to the position and orientation data of the wing edge (7) in the first data set, position and orientation data of the wing edge is determined, by extrapolation of the position and orientation data of the wing edge (7) of the first data set, also for the volumes (10) that were not taken into account when producing the first reduction subset and
    wherein the second data set is formed from the union of the position and orientation data of the wing edge (7) of the first data set with the supplementary position and orientation data of the wing edge (7),
  - wherein a second reduction subset is produced from the subset, wherein the intersection is formed from the points of the point cloud of the subset with a defined environment around the points of the second data set,
    wherein the determination of the position and orientation of the wing edge (7) in the result data set takes place based on the data of the second reduction subset.

3. The method according to claim 2, wherein
when producing the first reduction subset, only a portion of the points of the subset in the volumes (10) taken into account in production of the subset is incorporated into the first reduction subset,
  - wherein the point spacing between the points incorporated into the first reduction subset is greater than the point spacing in the subset.

4. The method according to claim 1, wherein
before determining the position and orientation of the wing edge (7), the data used for the evaluation is selected
  - wherein a first reduction subset of points of the point cloud (9) is produced from the subset,
    wherein only a portion of the points of the subset is incorporated into the first reduction subset,
    wherein the point spacing between the points incorporated into the first reduction subset is greater than the point spacing in the subset,
  - wherein in a first evaluation step, the position and orientation data of the wing edge (7) is determined as a first data set based on the points of the first reduction subset,
  - wherein a second reduction subset is produced from the subset, wherein the intersection is formed from the points of the point cloud in the subset with a defined environment around the points of the first data set,
  - wherein the determination of the position and orientation of the wing edge (7) in the result data set takes place based on the data of the second reduction subset.

* * * * *